March 1, 1949. H. P. MILLER, JR 2,462,884
ELECTRICAL CHOKE
Filed July 16, 1945
7 Sheets-Sheet 2

INVENTOR.
HERMAN P. MILLER JR.
BY
ATTORNEY.

INVENTOR.
HERMAN P. MILLER JR.
BY
ATTORNEY.

March 1, 1949. H. P. MILLER, JR 2,462,884
ELECTRICAL CHOKE
Filed July 16, 1945 7 Sheets-Sheet 5

Fig. 10.

INVENTOR.
HERMAN P. MILLER JR.
BY *Robert Harding*
ATTORNEY.

March 1, 1949.　　　H. P. MILLER, JR　　　2,462,884
ELECTRICAL CHOKE

Filed July 16, 1945　　　　　　　　　　　　7 Sheets-Sheet 6

Fig. 11.

INVENTOR.
HERMAN P. MILLER Jr.
BY
ATTORNEY.

March 1, 1949.  H. P. MILLER, JR  2,462,884
ELECTRICAL CHOKE
Filed July 16, 1945  7 Sheets-Sheet 7

INVENTOR.
HERMAN P. MILLER, JR.
BY
ATTORNEY

Patented Mar. 1, 1949

2,462,884

UNITED STATES PATENT OFFICE 2,462,884

ELECTRICAL CHOKE

Herman Potts Miller, Jr., East Orange, N. J., assignor to Federal Telephone and Radio Corporation, New York, N. Y., a corporation of Delaware Application July 16, 1945, Serial No. 605,425

4 Claims. (Cl. 175—359)

This invention relates to chokes, especially to radio frequency chokes.

A radio frequency choke intended for use over a predetermined range of frequencies should present a high impedance to radio frequency currents of all frequencies within the intended operating range. In order to meet this requirement, the choke should behave as nearly as possible like a single inductance of high value (high reactance) shunted by a single capacitance of low value (high reactance). If objectionable detuning is to be avoided, the requirements of high inductance and low capacitance assume additional importance when the choke is to be connected in parallel (with respect to radio frequencies) to a tuned circuit.

An approach to ideal behavior is obtained in a choke wound as a single layer solenoid having a high ratio of length to diameter. From the standpoint of saving space, however, it is frequently necessary to resort to some more compact form of construction, such as a choke consisting of several sections in series.

The performance of such multi-section chokes, however, is irregular and uneven, especially over an extended frequency range of, say, from 80 to 1000 kilocycles per second. Not only its electrical but also its thermal performance is difficult to control. Overheating is frequent, especially in a choke where the sections have different numbers of turns and the heat dissipation from the larger sections is high.

It is, therefore, an object of this invention to provide a coil which combines a desired frequency characteristic with a maximum of output without the danger of local overheating.

It is a further object of this invention to provide a coil wherein the coupling between sections may vary from section to section in any desired manner, sometimes rather abruptly, so as to obtain a predetermined response of the choke for an extended frequency range. It is particularly effective to vary the mutual inductance between adjacent coil portions, either by changing the number of turns, the iron cross section, coil spacing, or any of these factors in any desired combination.

More specifically, a coil is provided wherein the number of turns per section, or the cross section of iron of each section, or both, may vary non-linearly and especially in such a way that the rate of variation changes, preferably increasing with increasing number of turns and of cross sections of iron. In this way, the performance of this choke, especially in the upper part of the frequency range, can be improved to any desired extent without impairing its load capacity.

A more specific object of this invention is a coil in one portion of which the number of turns per section or the cross section of the iron varies non-linearly in one sense and varies non-linearly in an opposite sense in another adjacent portion. This variation in the number of turns or in the cross section of the iron can occur gradually or stepwise depending upon the number of sections provided.

Another object of the invention is to increase the effective frequency range of a choke by inserting a hollow iron core consisting of annular sections over which corresponding coil sections are wound.

Thus, when starting at a certain intermediate portion of the coil and progressing along the coil in opposite directions toward the ends of the coil, the number of turns per section or the cross section of iron may be caused to increase. According to another feature of this invention it may be caused to decrease.

A further specific object of this invention is a parallel-feed plate choke for use in a ten kilowatt power amplifier operating over a frequency range of 80 to 200 kilocycles per second.

This and other objects of this invention are schematically illustrated in the accompanying drawings in which.

Performance of chokes having different winding configurations was measured over a frequency range of 80 to 1000 kilocycles. The general conclusions reached should be applicable to the design of chokes for use over any frequency range and especially where multi-section "universally" wound chokes are practical.

The name "universal" originated from the machine developed for winding textile yarn into cops. In "universal" winding, the wire is wound upon a rotating cylindrical form by a feed which oscillates back and forth along the length of the form. The ratio of the reciprocal movements to the number of revolutions is such that the wire builds up into a lattice formation which is self-supporting. The winding mechanism forms a coil with a definite number of cross-overs per revolution, resulting in a definite number of turns per layer. Such lattice-form turns find wide use at broadcast and intermediate frequencies in radio receiving sets.

The invention, however, is not limited to "universal" winding sections. A basket-weave form of coil—which is used particularly at very high frequencies—or a honeycomb type of coil can also be used without exceeding the scope of this invention.

Figure 1:
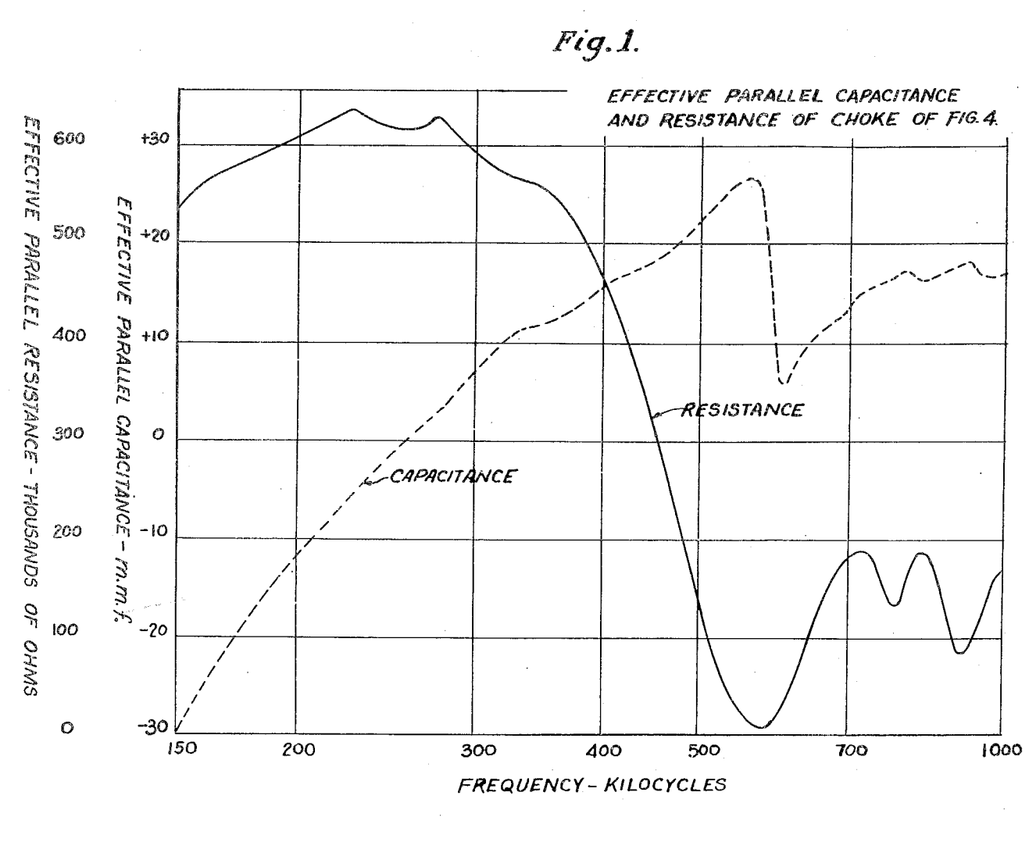
Fig. 1 shows the frequency function of certain readily measurable properties of a choke which have been found to be characteristic of choke performance.

Through the use of a Q-meter, measurements were made of the effective parallel resistance and capacitance (or inductance) of each choke. It was observed, and can be shown mathematically, that maximum and minimum points in the curve of effective parallel resistance coincide with discontinuities in the parallel capacitance curve. This is shown in Fig. 1. At the frequencies where the choke has low parallel resistance, appreciable amounts of power will be absorbed from a parallel-connected circuit, and the effective Q of the circuit will be reduced. For this reason, and because the variations in effective parallel resistance are of greater magnitude and more easily measured than the variations of parallel capacitance, the former were used as a criterion of choke performance.

Having thus established a good criterion for choke performance, I found that the performance of a choke was equalized over a predetermined frequency range when the adjacent sections of the coil consisted of a stepwise sharply progressive number of turns. The best results were obtained when the number of turns increased from the center of the coil toward both ends, first at a relatively slow rate and then at a relatively rapid rate. In this case, over a range of frequencies between 80 and 1000 kilocycles, the average effective parallel resistance in the second half of the range was almost the same as that in the first half and, in any case, considerably increased with respect to chokes not embodying the invention.

This effect was less expressed when the number of windings starting from the center of the coil progressively decreased toward its ends, first at a relatively rapid rate and then, with decreasing number of turns, at a relatively slow rate. Then the effective parallel resistance in the second half of the frequency range was found to be less than that of the first half of the frequency range, but it was still better than the corresponding effective parallel resistance of chokes not embodying the invention.

The table below gives a comparison of the dimensions and numbers of turns of the test chokes used:

| Choke | A (Fig. 2) | B (Fig. 3) | C (Fig. 4) | D (Fig. 5) |
|---|---|---|---|---|
| Form Diameter..Inches.. | 3 | 3 | 3 | 3 |
| Width of Section..do.... | ½ | ½ | ½ | ½ |
| Spacing—Center to Center............Inches.. | ¾ | ¾ | ¾ | ¾ |
| Wire Size (B & S)........ | 18 | 18 | 18 | 18 |
| *No. of turns* | | | | |
| Section 1................ | 86 | 135 | 65 | 27 |
| Section 2................ | 86 | 89 | 67 | 34 |
| Section 3................ | 86 | 73 | 73 | 42 |
| Section 4................ | 86 | 67 | 89 | 52 |
| Section 5................ | 86 | 65 | 135 | 65 |
| Section 6................ | 86 | 65 | 135 | 82 |
| Section 7................ | 86 | 67 | 89 | 102 |
| Section 8................ | 86 | 73 | 73 | 128 |
| Section 9................ | 86 | 89 | 67 | 180 |
| Section 10............... | 86 | 135 | 65 | 200 |
| Total................ | 860 | 858 | 858 | 892 |

The general configuration of the four chokes is shown in Figs. 2, 3, 4 and 5.

The sections are numbered consecutively from the top, or high radio frequency potential end of the choke. In each case, the connections between sections were made from the inside of one section to the outside of the next higher numbered section.

Figure 2:
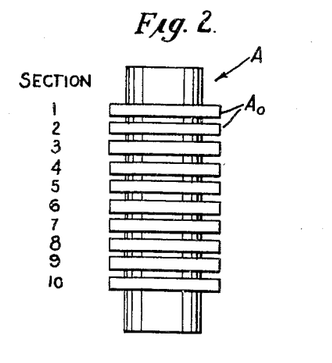
Fig. 2 shows a choke of known design.

In Fig. 2, choke A is the familiar type of radio frequency choke composed of equal sections $A_o$.

Figure 3:
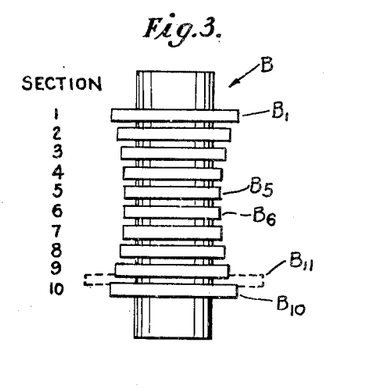
Fig. 3 shows a choke embodying the invention and having a predetermined and relatively even performance over a rather large frequency range.

In Fig. 3, choke B has large sections $B_1$, $B_{10}$ at each end, tapering down to small sections $B_5$, $B_6$, at the center.

Figure 4:
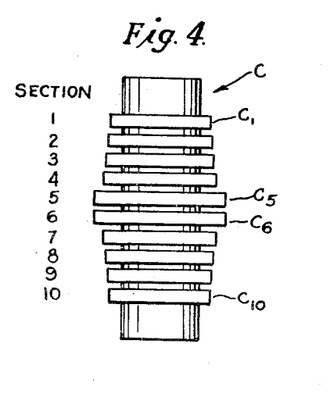
Fig. 4 shows the performance of a choke of which in the upper part of the frequency range is not as good as that of the choke shown in Fig. 3, yet better than that of the choke shown in Fig. 2.

In Fig. 4, choke C has relatively small end sections $C_1$, $C_{10}$ and relatively large center sections $C_5$, $C_6$.

Figure 5:
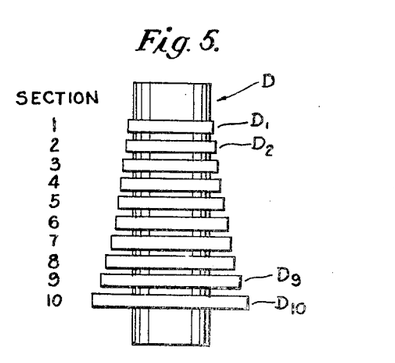
Fig. 5 shows a modified choke with another predetermined performance.

In Fig. 5, choke D has relatively small sections $D_1$, $D_2$ at one end and relatively large sections $D_9$, $D_{10}$ at the other end.

Figure 6:
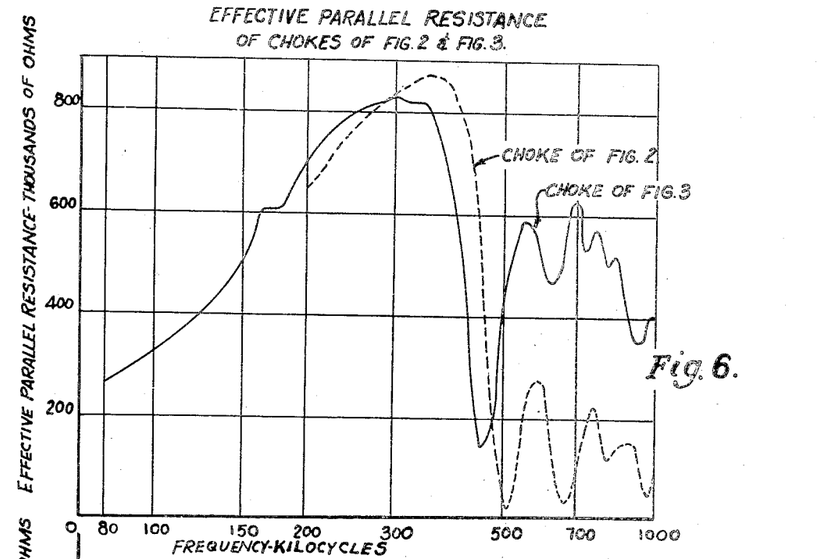
Fig. 6 shows the effective parallel resistance as a function of frequency of a choke of known design according to Fig. 2 and of a choke according to Fig. 3.

Fig. 6 compares the performance of chokes A and B. It is readily apparent from the curves that choke B will have much better performance over a predetermined and relatively large range of frequencies than choke A.

Figure 7:
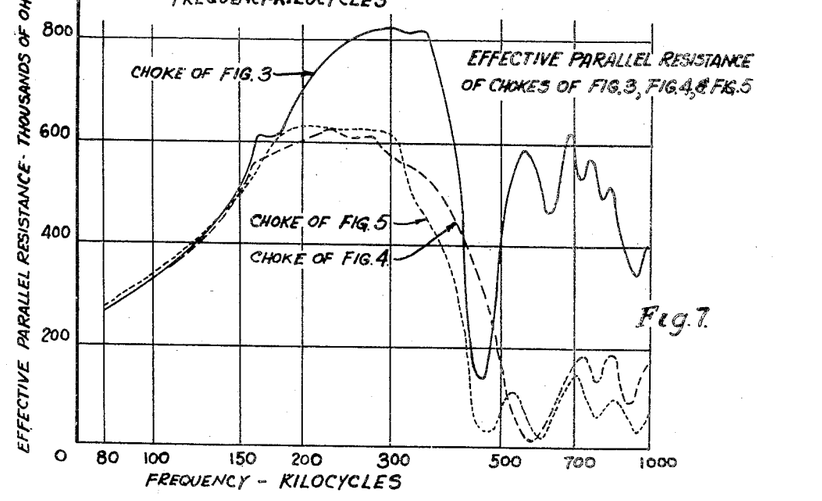
Fig. 7 shows the effective parallel resistance of chokes according to Figs. 3, 4 and 5 as a function of frequency.

Fig. 7 gives comparative curves for chokes B, C and D. These show that D does not approach the performance of choke B, and not even that of C. Below about 200 kilocycles there is little difference but it must be remembered that the major portion of the useful frequency range of a choke will lie above the self-resonant frequency, in this case about 250 kilocycles. This is because the shunt susceptance will be excessive at frequencies below about 75% of the self-resonant frequency. Above 200 kilocycles the effective parallel resistance of choke B maintains a value the average of which is several times that of either of the other chokes.

Figure 8:
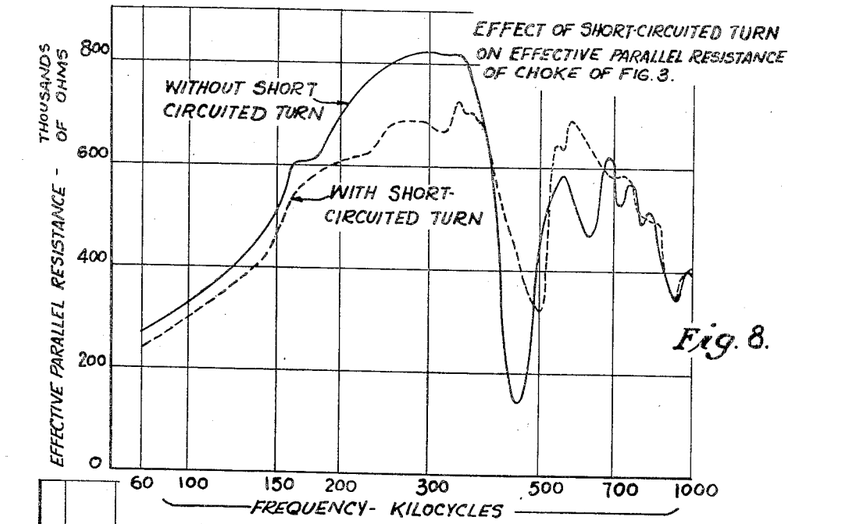
Fig. 8 shows the effective parallel resistance as a function of frequency of a choke according to Fig. 3 with and without short-circuiting means.

Although choke B affords a substantial improvement in performance over the others, a dip in the parallel resistance curve appears at about 450 kilocycles. In an attempt to minimize this dip, a short-circuited turn of heavy copper strap $B_{11}$ is coupled to the bottom section B10 of the choke B, as indicated in dotted lines in Fig. 3. Fig. 8 shows the effect of this change. In the region below about 400 kilocycles the effective parallel resistance is somewhat lower with the short-circuited turn than without it. Since the choke is essentially inductive over most of this region, the decrease is probably due to the decrease in inductance of the bottom section caused by the shorted turn. Above 400 kilocycles, however, there is some improvement, especially at the point where the worst dip formerly occurred.

In the design of a choke the question of whether or not to use a short-circuited turn will depend principally upon the desired frequency range and the average advantage or disadvantage of the shorted turn over this range.

It was thought possible that a higher effective parallel resistance could be obtained by increasing the inductance of the choke through use of an iron dust core. The iron dust core permits an increase of inductane without a proportionate increase of distributed capacitance. Choke B was chosen for the tests.

Figure 10:
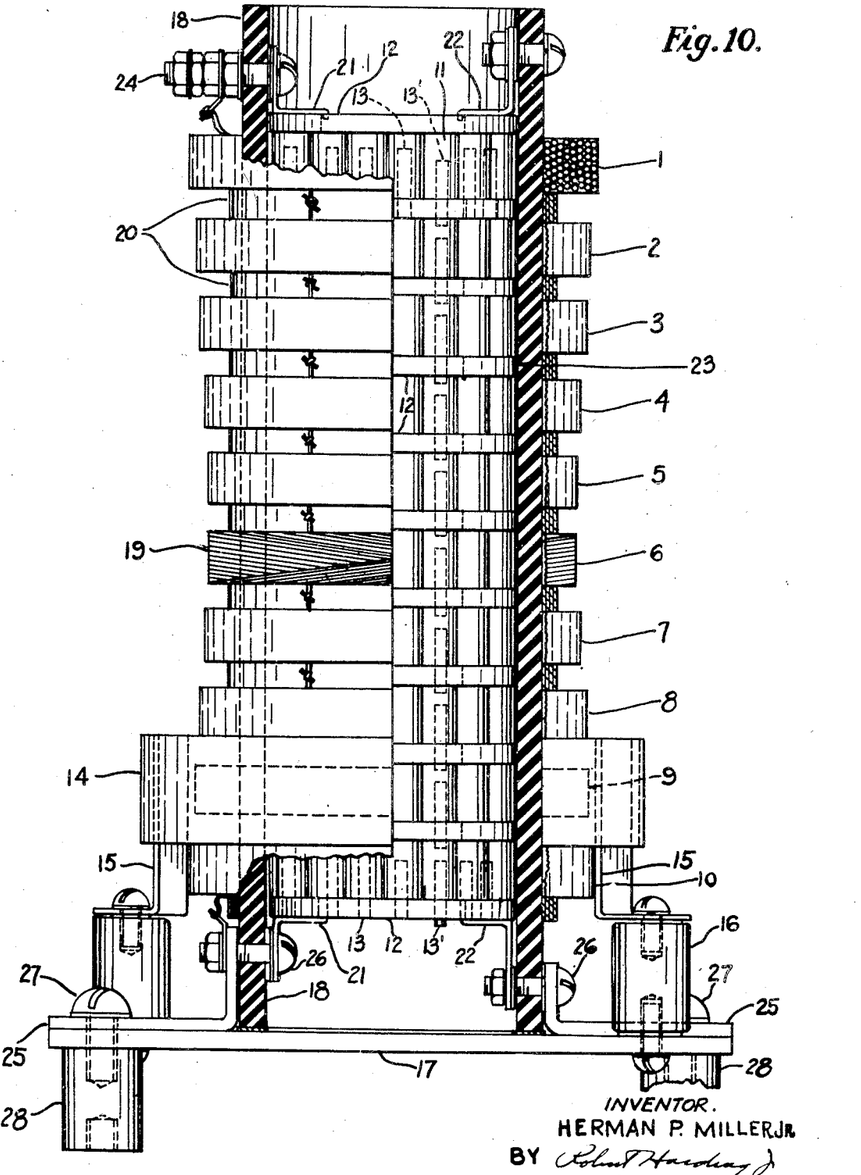
Fig. 10 and 11 show front and top elevations, respectively, the former in section along line I—I in Fig. 11 of a choke according to Fig. 3, actually built to specifications embodying the invention.
Figure 11:
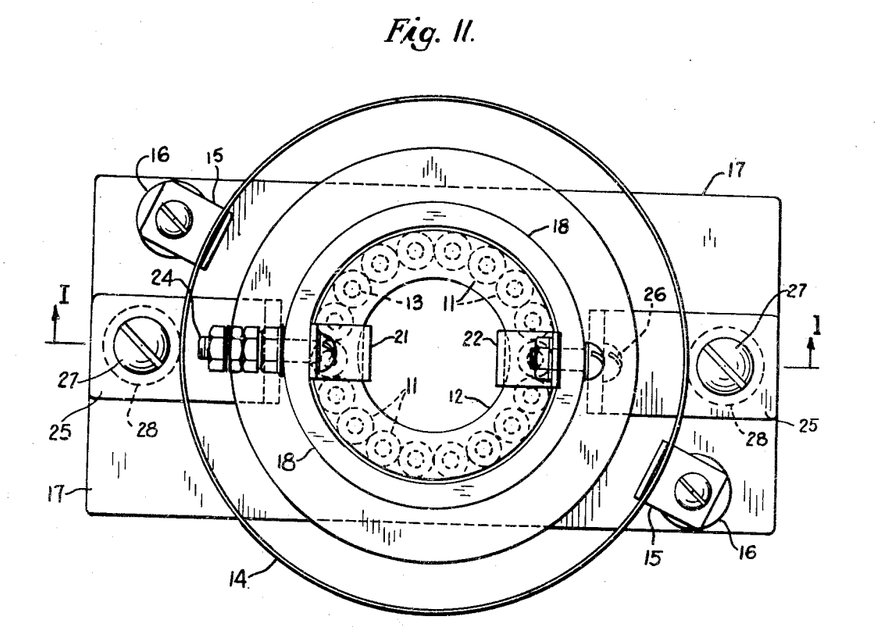
Figure 12:
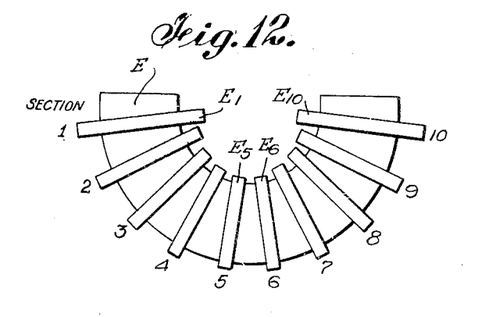
Fig. 12 shows an embodiment of the invention with the coils mounted on a core having a circular axis.
Figure 13:
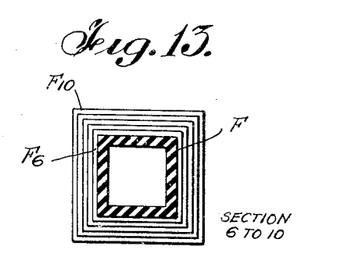
Figs. 13 and 14 show the choke with a square and oval cross-section, respectively.
Figure 14:
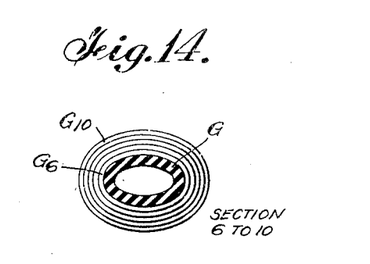
Figure 15:
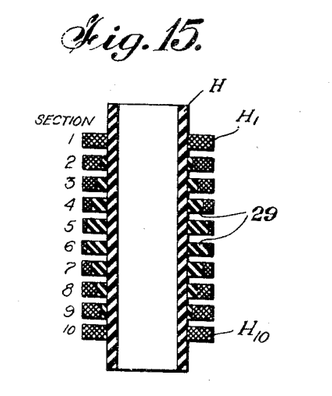
Fig. 15 shows the choke with the coil sections inside diameters varied and the outside diameters constant.
Figure 16:
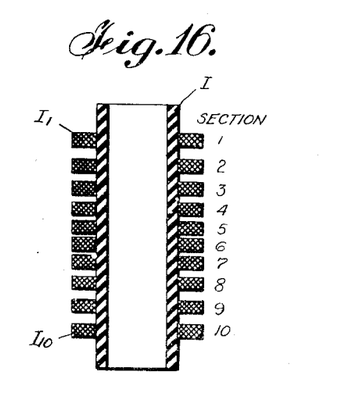
Fig. 16 shows the choke with the sections of the coil unequally spaced.

As shown in Figs. 10 and 11, each coil section 1 through 10 is provided with an individual core. Each core consists of a number of iron dust slugs 11 having a length of 9/16 inch, mounted on a non-magnetic ring 12 3/16" thick and arranged along the inside of the corresponding coil section. Ring 12 is preferably made of non-magnetic material such as Bakelite, and slugs 11 are loosely supported thereon by means of Bakelite pins 13. Thus, undesirable coupling between choke sections is minimized by leaving a gap of 3/16 inch between adjacent cores.

A short-circuiting ring assembly includes ring 14 which through metal strip 15 and insulating space 16 is supported on base plate 17. Plate 17 also supports a ceramic coil form 18 which on its outside carries coil sections 1 through 10. These coil sections have a distribution of turns similar to that shown in Fig. 3. The mode of winding is indicated at 19. Part 20 is a distancing piece consisting of fibre glass surrounded by linen thread. Inside of form 18 on (preferably non-magnetic) angle pieces 21, 22, the core assembly 23 is mounted. Core assembly 23 includes a number of parallel Bakelite rings 12 which are bridged by the iron dust slugs 11 and aligned by one of the Bakelite pins 13. One pin 13' in each ring extends through the ring so as to line up the cores on the ring beneath. Rings 12 with the cores in place are piled upon on each other and supported on clamps 21 and 22 at the bottom. The corresponding clamps 21 and 22 at the top are then adjusted so as to hold rings 12 together and in the proper position. Terminal 24 is attached to coil form 18 and especially to the support 22 for core assembly 23. Coil form 18, carrying the entire choke except short-circuiting ring 14, is attached to base plate 17 by means of angle pieces 25 and screws 26. The left screw 26 also serves as the lower terminal of the choke. Base plate 17 is attached by screws 27 to spacers 28 which, in turn, can be attached to a panel or chassis (not shown) in any desired position.

Figure 9:
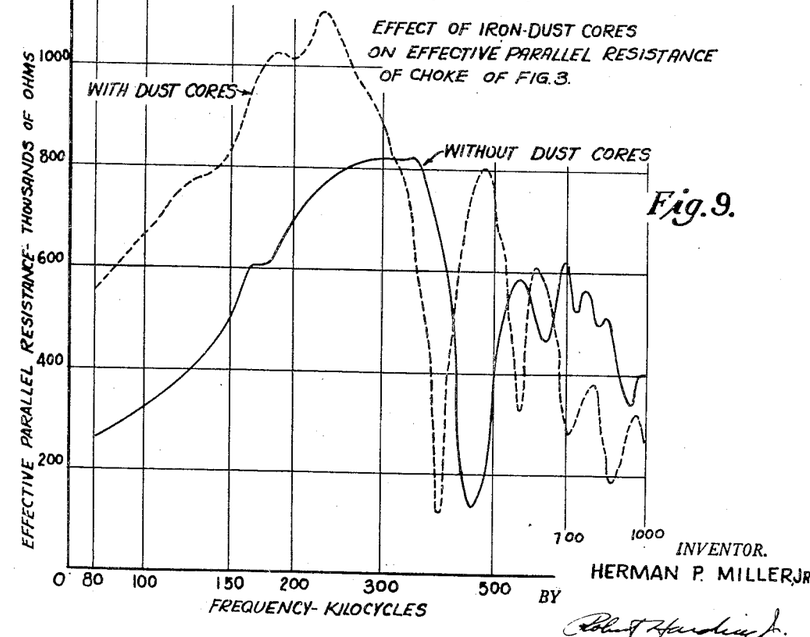
Fig. 9 shows the effect of iron dust cores on the frequency response of a preferred choke.

The graphic results of the tests with this choke are shown in Fig. 9. The increased inductance provided by the core results in materially increased parallel resistance at low frequencies where the choke's inductance is predominant in determining its behavior. At the high end of the frequency range, however, the core is slightly less advantageous.

Choke B was originally designed for optimum performance without the iron dust core, and it is probable that an improvement in the high frequency performance of choke B with the core could have been obtained by further adjustment of the number of turns in each section. However, since the choke was intended for use over the frequency range of 80 to 200 kilocycles, the high frequency performance was not considered sufficiently important to warrant further experimentation.

Such improvement, however, can be made without exceeding the scope of this invention.

The actual design of a choke similar to choke B can probably best be accomplished experimentally. A choke of several sections, preferably with equal numbers of turns per section, may be wound and measurements made over the operating frequency range in the manner which has been described. Turns may then be removed, a few at a time, from the center sections, new measuremens being made after each change. The experience of a few trials will indicate the method to be followed in obtaining the final choke design.

In some applications it may be desirable to shift the point at which the major dip in the parallel resistance curve occurs (450 kilocycles in the case of choke B) to a frequency which is seldom or never used. This is readily done by changing the proportionate numbers of turns in the choke sections. The use of a short-circuited turn or of an iron dust core presents additional possibilities for shifting the frequency of the major dip, as is shown by Figs. 8 and 9. The short-circuited turn causes the major dip to occur at a higher frequency than formerly while the iron dust core causes it to occur at a lower frequency.

I have also shifted the major dip by means of a single layer winding on the ceramic form in the space between adjacent pies.

Attempts have been made to analyze the performance of radio frequency chokes mathematically but the many variables, principally distributed capacitance within choke sections and between sections, distributed inductance, mutual inductance, and end effects due to proximity to external bodies, render the problem so difficult as to defy exact analysis.

As an extremely simplified analysis, consider the case where two choke sections of unequal electrical size are respectively inductive and capacitive at some particular frequency in the amount which produces series resonance of the combination. The result will be a low point in the parallel resistance curve at this frequency.

It is also possible, instead of varying the number of turns per section or the spacing between adjacent sections, to vary the cross section of the iron in each coil section or to vary the number of turns, coil spacing, and cross section of iron so as to obtain the desired effective parallel resistance characteristic over an extended frequency range.

In Fig. 10, for example, all the sections can be provided with an equal number of turns, and the number of iron dust slugs per section can be varied in a non-linear manner, with the minimum number of slugs arranged in the center of the coil and the maximum number of slugs at the end of the coil. This will prove practical especially at the low frequency range where the iron slugs have their main effect. The dips in the characteristic curve seem to be due mainly to coupling between pies. Since the air gap between pies in Fig. 10 is considerable, changing the iron per coil may have comparatively little effect on the coupling.

Another way would be to change the lengths of the iron slugs so as to adjust the spacing between the slugs. This would mean that the Bakelite spacers 12 would vary in thickness.

What I claim is:

1. In a choke, an iron core including a number of cylindrical sections separated by non-magnetic gaps and having an air passage extending therethrough, a coil wound around said core about a linear axis extending through said air passage, said coil including a number of spaced sections each wound around a core section, said spaced sections having a relatively small number of turns at the center of the coil and a stepwise increasing number of turns when approaching the ends of the coil, the steps of increase increasing with increasing number of turns, and a short circuit formed around at least one of the coil sections near the ends of the coil.

2. In a choke according to claim 1, core sections of substantially equal size and coil sections having equal axial but different radial extensions, the latter corresponding to different numbers of turns.

3. A choke according to claim 1, wherein the short circuit consists of a conductive ring surrounding at a distance a section preceding an end section of the coil, said ring extending axially over said section and the spaces adjoining said section.

4. In a choke, a coil wound around a linear axis, said coil including a number of adjacent sections, insulating strips spacing said sections, said sections having a relatively small number of turns at the center of the coil and a stepwise increasing number of turns when approaching the ends of the coil, the steps of increase increasing with increasing number of turns, core assembly including a number of core sections each consisting of a number of iron dust cylinders aligned in an annular array along the inside of a coil section with their axes parallel to the coil axis, each core section slightly projecting from beneath the associated coil section, non-magnetic rings coaxial with the coil axis for spacing adjacent core sections, means for aligning said iron dust cylinders on the rings, means for holding the rings together so as to form a single structure including all core sections, a tubular ceramic coil form supporting on its outside the coil sections and on its inside said core assembly, short-circuiting means surrounding at a distance a coil section preceding an end section of the coil, a base plate, and means for supporting said tubular ceramic coil form and said short-circuiting means on said base plate.

HERMAN POTTS MILLER, Jr.

REFERENCES CITED

The following references are of record in the file of this patent:

UNITED STATES PATENTS

| Number | Name | Date |
| --- | --- | --- |
| Re. 21,074 | Crossley et al. | May 9, 1939 |
| 521,269 | Michl | June 12, 1894 |
| 1,758,820 | Piermanns | May 13, 1930 |
| 2,038,294 | Johnson | Apr. 21, 1936 |
| 2,159,534 | Ruska | May 23, 1939 |
| 2,206,261 | O'Callaghan | July 2, 1940 |
| 2,219,396 | Plebanski | Oct. 29, 1940 |
| 2,258,261 | Roosenstein | Oct. 7, 1941 |
| 2,351,604 | Ferrill | June 20, 1944 |

FOREIGN PATENTS

| Number | Country | Date |
| --- | --- | --- |
| 23,524 | Australia | July 16, 1935 |
| 532,251 | Germany | Aug. 26, 1931 |